United States Patent
Nakagawa et al.

(10) Patent No.: US 7,722,844 B2
(45) Date of Patent: May 25, 2010

(54) EXHAUST SMOKE DENITRATING APPARATUS AND METHOD OF EXHAUST SMOKE DENITRATION

(75) Inventors: Ryosuke Nakagawa, Hiroshima (JP); Tetsurou Hikino, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 468 days.

(21) Appl. No.: 11/719,728

(22) PCT Filed: Dec. 10, 2004

(86) PCT No.: PCT/JP2004/018484
§ 371 (c)(1),
(2), (4) Date: May 18, 2007

(87) PCT Pub. No.: WO2006/061912
PCT Pub. Date: Jun. 15, 2006

(65) Prior Publication Data
US 2009/0220401 A1    Sep. 3, 2009

(51) Int. Cl.
| | |
|---|---|
| B01D 53/56 | (2006.01) |
| A61L 9/00 | (2006.01) |
| A61L 2/20 | (2006.01) |
| F01N 3/20 | (2006.01) |
| A62B 7/08 | (2006.01) |
| F01N 3/00 | (2006.01) |
| F01N 3/10 | (2006.01) |
| B01D 53/34 | (2006.01) |
| B01J 10/00 | (2006.01) |
| A62D 3/00 | (2007.01) |
| B01J 8/02 | (2006.01) |
| F28D 7/00 | (2006.01) |

(52) U.S. Cl. .......... 423/239.1; 422/28; 422/29; 422/33; 422/105; 422/123; 422/124; 422/168; 422/174; 422/177; 422/195; 422/198; 422/199; 422/211; 422/235

(58) Field of Classification Search .......... None
See application file for complete search history.

(56) References Cited

U.S. PATENT DOCUMENTS

| 6,315,969 B1 | 11/2001 | Yoshida |
|---|---|---|
| 2002/0044886 A1 | 4/2002 | Larco |

FOREIGN PATENT DOCUMENTS

JP    54-022010    2/1979

(Continued)

OTHER PUBLICATIONS

English Language Abstract of JP 5-049856, Mar. 2, 1993.

(Continued)

*Primary Examiner*—Melvin C Mayes
*Assistant Examiner*—Sarah Van Oudenaren
(74) *Attorney, Agent, or Firm*—Greenblum & Bernstein P.L.C.

(57) ABSTRACT

An exhaust smoke denitrating apparatus in which using an $NH_3$ injection unit, compressed air is fed from blower to ejector for extracting of exhaust gas from HRSG1, and with thus obtained mixed gas, $NH_3$-containing gas is produced from $NH_3$ water by $NH_3$ water evaporator, the $NH_3$-containing gas injected through $NH_3$-containing gas injection nozzle of the HRSG1 disposed on a front stream side of denitration catalyst layer. As any high-temperature exhaust gas is cooled and diluted by compressed air, there is no danger of oxidation of $NH_3$ during the stage of evaporation of $NH_3$ water. The moisture level of exhaust gas can be lowered, thereby enabling inhibition of any drain generation in exhaust gas extraction piping. Air warming within $NH_3$ water evaporation system can be carried out at an early stage. The temperature of $NH_3$-containing gas obtained by evaporation of $NH_3$ water can be lowered, and a lowering of thermal stress within $NH_3$-containing gas piping can be easily accomplished, so that denitration of exhaust gas can be easily accomplished. Even when sulfur oxides are contained in exhaust gas, it is feasible to avoid any problem of clogging of the $NH_3$ water injection nozzle.

3 Claims, 6 Drawing Sheets

| | FOREIGN PATENT DOCUMENTS | |
|---|---|---|
| JP | 5-049856 | 3/1993 |
| JP | 7-016431 | 1/1995 |
| JP | 9-038466 | 2/1997 |
| JP | 2004-167450 | 6/2004 |
| JP | 2005-000765 | 1/2005 |

OTHER PUBLICATIONS

English Language Abstract of JP 9-038466, Feb. 10, 1997.
English Language Abstract of JP 54-022010, Feb. 19, 1979.
English Language Abstract of JP 2004-167450, Jun. 17, 2004.
English Language Abstract of JP 7-016431, Jan. 20, 1995.
English Language Abstract of JP 2005-000765, Jan. 6, 2005.

PRIOR ART

EXHAUST SMOKE DENITRATING APPARATUS AND METHOD OF EXHAUST SMOKE DENITRATION

TECHNICAL FIELD

The present invention relates to an apparatus and method for exhaust smoke denitration using an ammonia gas and a denitration catalyst, and more particularly, an apparatus and method for exhaust smoke denitration that improves reliability of an exhaust gas circulating ammonia injection unit, also allows reducing the problem of nozzle clogging even with a sulfur oxide-containing exhaust gas, and reduces production of dioxins in terms of a treatment of an exhaust gas from a municipal incinerator.

BACKGROUND ART

In a combined cycle plant and the like, used is an exhaust heat recovery boiler (sometimes referred to as HRSG) that obtains steam by heating water that flows in an evaporator arranged in a gas turbine exhaust gas passage using gas turbine exhaust, and in the HRSG, disposed is an exhaust smoke denitrating apparatus that, in order to eliminate nitrogen oxides in an exhaust gas, injects ammonia as a reducing agent for a denitration reaction from an ammonia injection unit at an upstream side of a disposing part of a denitration catalyst, sufficiently mixes the ammonia with the exhaust gas, and then causes a denitration reaction on the denitration catalyst.

In recent years, for greater ease in storage and handling than liquefied ammonia, ammonia water is used in many cases for the abovementioned ammonia injection unit, and as the device for evaporating the ammonia water, there is an electric heater evaporation method and an exhaust gas circulation type that extracts a part of the exhaust gas from the exhaust heat recovery boiler (HRSG) and uses the extracted exhaust gas for evaporation. From the viewpoint of improvement in plant efficiency, the exhaust gas circulation type that is relatively small in utility usage is often used.

The abovementioned exhaust gas circulating ammonia injection unit employs a method for extracting a high-temperature exhaust gas from the exhaust heat recovery boiler to heat ammonia water and supplying again the ammonia water as ammonia vapor into the exhaust gas passage.

Figure 6:
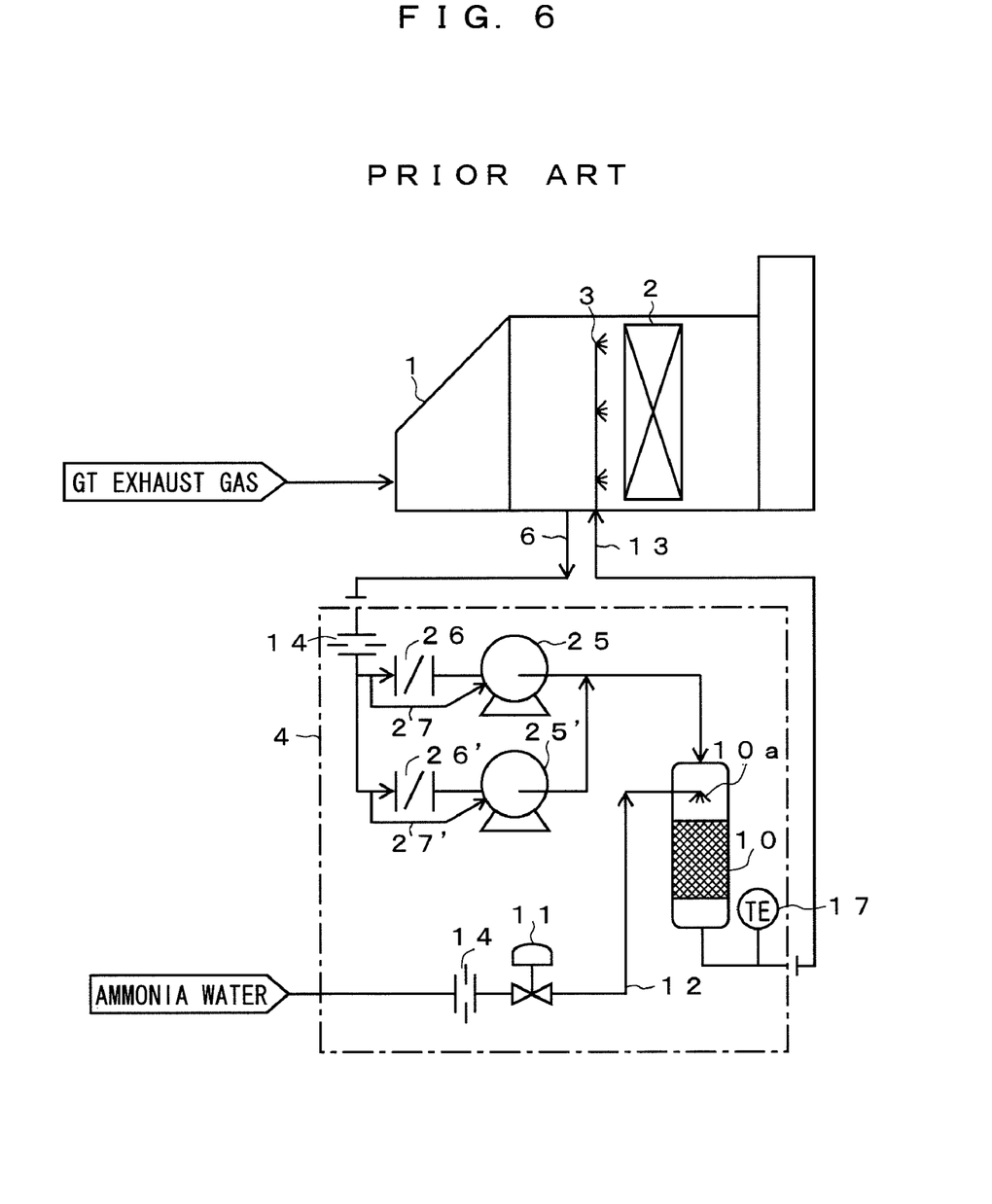
FIG. 6 is a flow diagram of an exhaust smoke denitrating apparatus showing a conventional art.

In order to display the performance of the abovementioned denitration catalyst, the exhaust smoke denitrating apparatus is usually disposed in an exhaust gas temperature region of 300 to 350° C. This exhaust gas temperature region is an exhaust gas passage in an area where a high-temperature evaporator is disposed or on a rear stream side thereof. FIG. 6 shows a configuration example of a conventional exhaust smoke denitrating apparatus using an exhaust gas circulating ammonia injection unit applied to an exhaust heat recovery boiler.

Conventionally, a 300-350° C. exhaust gas extracted from an exhaust heat recovery boiler 1 is supplied through an exhaust gas supply pipe 6 to an ammonia injection unit 4, and after the pressure is raised by circulating fans 25 and 25' so as to overcome a pressure loss of piping equipment, the exhaust gas has been sent to an ammonia water evaporator 10. Normally, a total of two circulating fans 25 and 25' are used for a constant operation and a reserve, and heat resistance to 300 to 350° C. is required for both. Ammonia water regulated to a necessary flow by an ammonia injection control valve 11 is injected into the evaporator 10, and is heated by the exhaust gas inside the evaporator 10, so that an ammonia-containing vapor is obtained.

For evaporation of the ammonia water, the exhaust gas temperature at an outlet of the evaporator 10 is lowered to approximately 120 to 150° C., and this exhaust gas is injected by the ammonia injection unit 4, through an ammonia-containing gas supply pipe 13, to the upstream of a denitration catalyst layer 2 from an ammonia-containing gas injection nozzle 3 provided in a duct of the exhaust heat recovery boiler 1.

Patent Document 1: Japanese Published Unexamined Patent Application No. H07-16431

DISCLOSURE OF THE INVENTION

In the abovementioned conventional art, heat resistance is required for the circulating fan 25 as it handles a high-pressure gas extracted from the exhaust heat recovery boiler 1, and it is necessary for the circulating fan 25 itself and a bearing portion thereof and the like to have a material and structure having heat resistance. In particular, it is necessary for the bearing portion and the like to prevent burnout by a high-temperature exhaust gas by use of cooling air or cooling water.

In addition, it has been assumed that the reserve circulating fan 25' is not directly exposed to a high-temperature exhaust gas since there is a damper 26' installed on the upstream of the fan 25', however, in actuality, a problem that the bearing portion abnormally rises in temperature and burns out has occurred due to heat transmission through a communication pipe even when the reserve circulating fan 25' has stopped operation. In order to avoid this abnormal temperature rise and burnout, it is necessary to perform operation to activate the fan 25' at fixed intervals or add a protector for the reserve standby fan 25', and for these there has been a problem of complication of the ammonia water injection unit.

In addition, when sulfur oxides ($SO_2$ and $SO_3$) are contained in the exhaust gas, as a result of an injection of the ammonia water in the ammonia water evaporator 10, the temperature of the exhaust gas in the vicinity of the ammonia water injection nozzle 10a is lowered to a temperature range where acidic ammonium sulfate produced by a reaction of the sulfur oxides in the exhaust gas with ammonia precipitates, so that the ammonia water injection nozzle 10a may be clogged.

It is an object of the present invention to provide an apparatus and method for exhaust smoke denitration using a simple ammonia injection unit that has eliminated the abovementioned problems related to handling of a high-temperature exhaust gas, or even when sulfur oxides are contained in an exhaust gas, using an ammonia injection unit that does not cause a problem of clogging of the ammonia water injection nozzle.

The abovementioned object of the present invention is attained by the following apparatus and method.

A first aspect of the invention provides an exhaust smoke denitrating apparatus which eliminates nitrogen oxides in an exhaust gas, for which an ammonia injection unit (4) and a denitration catalyst layer (2) are disposed on a passage of an exhaust gas discharged from a gas turbine and, wherein the ammonia injection unit (4) comprises: an exhaust gas supply passage (6) that makes a part of the exhaust gas from the gas turbine exhaust gas passage flow; an ejector (7) that extracts the exhaust gas, provided at a front end of the exhaust gas supply passage (6); a compressed air blower (8 or 8') that supplies compressed air to the ejector (7); a mixed gas supply passage that supplies a mixed gas of an exhaust gas and air obtained by the ejector (7); an ammonia water supply passage (12) that supplies ammonia water; an ammonia water evaporator (10) that mixes the mixed gas of an exhaust gas and air from the mixed gas supply passage and the ammonia water from the ammonia water supply passage (12) and evaporates the ammonia water; an ammonia-containing gas supply passage (13) that supplies an ammonia-containing gas obtained by the ammonia water evaporator (10) to the gas turbine exhaust gas passage on a front stream side of the denitration catalyst layer (2); and an ammonia-containing gas injection nozzle (3) provided at a front end of the ammonia-containing gas supply passage (13).

A second aspect of the invention provides an exhaust smoke denitrating apparatus which eliminates nitrogen oxides in an exhaust gas, for which an ammonia injection unit (4) and a denitration catalyst layer (2) are disposed on a passage of an exhaust gas discharged from a gas turbine and, wherein the ammonia injection unit (4) comprises: an exhaust gas supply passage (6) that makes a part of the exhaust gas from the gas turbine exhaust gas passage flow; an ejector (7) that extracts the exhaust gas, provided at a front end of the exhaust gas supply passage (6); a compressed air blower (8) that supplies compressed air to the ejector (7); a mixed gas supply passage that supplies a mixed gas of an exhaust gas and air obtained by the ejector (7); an ammonia water supply passage (12) that supplies ammonia water; an ammonia water evaporator (10) that mixes the mixed gas of an exhaust gas and air from the mixed gas supply passage and the ammonia water from the ammonia water supply passage (12) and evaporates the ammonia water; an ammonia-containing gas supply passage (13) that supplies an ammonia-containing gas obtained by the ammonia water evaporator (10) to the gas turbine exhaust gas passage on a front stream side of the denitration catalyst layer (2); an ammonia-containing gas injection nozzle (3) provided at a front end of the ammonia-containing gas supply passage (13); an exhaust gas flow regulation valve (15) and an exhaust gas flowmeter (16) provided on the exhaust gas supply passage (6); an ammonia-containing gas thermometer (17) provided on the ammonia-containing gas supply passage (13); and a controller (19) that regulates the exhaust gas flow regulation valve (15) based on a measured temperature of the ammonia-containing gas of the ammonia-containing gas thermometer (17) and a measured value of an exhaust gas flow of the exhaust gas flowmeter (16) and controls a temperature of the ammonia-containing gas in the ammonia-containing gas supply passage (13) to 100 to 150° C.

A third aspect of the invention provides an exhaust smoke denitrating apparatus which eliminates nitrogen oxides in an exhaust gas, for which an ammonia injection unit (4) and a denitration catalyst layer (2) are disposed on a passage (22) of an exhaust gas discharged from a municipal incinerator (21) and, wherein the ammonia injection unit (4) comprises: an exhaust gas supply passage (6) that makes a part of the exhaust gas from the exhaust gas passage (22) of the municipal incinerator flow; an ammonia water supply passage (12) that supplies ammonia water; an ammonia water evaporator (10) that mixes the exhaust gas from the exhaust gas supply passage (6) and the ammonia water from the ammonia water supply passage (12) and evaporates the ammonia water; an ammonia-containing gas supply passage (13) that supplies an ammonia-containing gas obtained by the ammonia water evaporator (10) to the municipal incinerator discharged exhaust gas passage on a front stream side of the denitration catalyst layer (2); an ejector (7) provided on the ammonia-containing gas supply passage (13); a compressed air blower (8) that supplies compressed air to the ejector (7); and an ammonia-containing gas injection nozzle (3) provided at a front end of the ammonia-containing gas supply passage (13).

A fourth aspect of the invention provides a method for exhaust smoke denitration which supplies an ammonia gas into a passage of an exhaust gas discharged from a gas turbine and eliminates nitrogen oxides in the exhaust gas by use of a denitration catalyst, wherein a part of the gas turbine exhaust gas is extracted from the exhaust gas passage, the extracted exhaust gas is mixed with compressed air and then is further mixed with ammonia water so as to produce an ammonia-containing gas, and the ammonia-containing gas is supplied to the exhaust gas passage so as to contact the denitration catalyst.

A fifth aspect of the invention provides a method for exhaust smoke denitration which supplies an ammonia gas into a passage of an exhaust gas discharged from a gas turbine and eliminates nitrogen oxides in the exhaust gas by use of a denitration catalyst, wherein when extracting a part of the gas turbine exhaust gas from the exhaust gas passage, mixing the extracted exhaust gas with compressed air and then further mixing the mixture with ammonia water so as to produce an ammonia-containing gas, and supplying the ammonia-containing gas to the exhaust gas passage so as to contact the denitration catalyst, based on a temperature of the ammonia-containing gas and a flow of the exhaust gas extracted from the gas turbine exhaust gas passage, the flow of the exhaust gas extracted from the gas turbine exhaust gas is regulated so as to control the temperature of the ammonia-containing gas to 100 to 150° C., and the ammonia-containing gas is supplied to the exhaust gas passage so as to contact the denitration catalyst.

A sixth aspect of the invention provides a method for exhaust smoke denitration which supplies an ammonia gas into a passage of an exhaust gas discharged from a municipal incinerator (21) and eliminates nitrogen oxides in the exhaust gas by use of a denitration catalyst, wherein a part of the exhaust gas from the municipal incinerator (21) is extracted from the exhaust gas passage (22), the extracted exhaust gas is mixed with ammonia water so as to produce an ammonia-containing gas, and an ammonia-mixed gas obtained by further mixing the ammonia-containing gas with compressed air is supplied to the exhaust gas passage (22) so as to contact the denitration catalyst.

According to the first and fourth aspects of the invention, the following effects are provided.

First, since a high-temperature (for example, 450° C.) exhaust gas extracted from the gas turbine is cooled by compressed air to, for example, 300° C., there is no possibility of oxidization of ammonia during the stage of evaporation of ammonia water even when a high-temperature exhaust gas is used.

Moreover, as the high-temperature exhaust gas extracted from the gas turbine is diluted by the compressed air, the moisture level of the exhaust gas can be lowered, thereby enabling inhibition of any drain generation in an exhaust gas extraction system, and thus air warming within the ammonia water evaporation system can be carried out from a low-temperature range (for example, 50 to 60° C.).

Moreover, since the high-temperature exhaust gas can be extracted so that the ammonia water can be evaporated at an early stage, a reduction in the air-warming time at start-up of the ammonia water evaporation system and the like can be efficiently carried out. Furthermore, the temperature of an ammonia-containing gas obtained by evaporation of the ammonia water can be lowered to, for example, 100 to 150° C., and a reduction in thermal stress within ammonia-containing gas supply system can be easily accomplished.

By the second and fifth aspects of the invention, the exhaust gas flow to the compressed air supply system can be regulated based on the temperature of the ammonia-containing gas at an outlet of the ammonia water evaporation system and the exhaust gas flow led to the ammonia water evaporation system.

For example, when the ammonia-containing-gas is not supplied to the exhaust gas passage of the gas turbine, by regulating the exhaust gas flow led to the ammonia water evaporation system so as to keep the temperature of the ammonia-containing gas at the outlet of the ammonia water evaporation system at 100 to 150° C., air warming and a drain prevention within the ammonia water evaporation system can be carried out, and even when a supply of the ammonia-containing gas to the exhaust gas passage of the gas turbine is started, by regulating the exhaust gas flow led to the ammonia water evaporation system, the ammonia-containing gas temperature can be kept at, for example, 100 to 150° C., and a reduction in thermal stress within ammonia-containing gas supply system can be easily accomplished.

At the time of municipal incineration, it is necessary to prevent the temperature in the exhaust gas treatment system from reaching 300 to 400° C., which is a dioxin producing temperature range. According to the third and sixth aspects of the invention, by keeping, at 230 to 250° C., the temperature of the ammonia-containing gas obtained by extracting a, for example, 450° C. high-temperature exhaust gas from a municipal incinerator from the exhaust gas passage and mixing ammonia water with the extracted exhaust gas so as to evaporate the ammonia water, any dioxin production within the ammonia water evaporation system can be inhibited. Moreover, by mixing the ammonia-containing gas with compressed air, an obtained mixed gas can be injected into the exhaust-gas passage of the municipal incinerator after being cooled to, for example, 100 to 150° C., which reduces thermal stress within the ammonia-containing gas supply system and the like is reduced.

Moreover, effects common to the first to sixth aspects of the invention are as follows.

That is, since an exhaust gas extracted from the exhaust gas passage and the like is absorbed by compressed air obtained by use of a blower or the like, the blower for compressed air production is not directly exposed to a high-temperature exhaust gas, so that no cooler for the blower for compressed air production is necessary, or no protector for preventing the blower from a bearing burnout and the like is required.

Moreover, as a result of the high-temperature exhaust gas being diluted by air from the blower for compressed air production, since the concentration of sulfur trioxide ($SO_3$) in the exhaust gas is diluted, it becomes possible to hold down the precipitation temperature of acidic ammonium sulfate produced when the sulfur trioxide is reacted to the ammonia water, so that there is no possibility of precipitation ammonium sulfate in the ammonia water injection nozzle of the ammonia water evaporator even when sulfur dioxide ($SO_2$) is contained in the exhaust gas.

BEST MODES FOR CARRYING OUT THE INVENTION

Hereinafter, embodiments of the present invention shall be described along with the drawings.

Embodiment 1

Embodiment 1 shall now be described based on FIG. 1.

Figure 1:
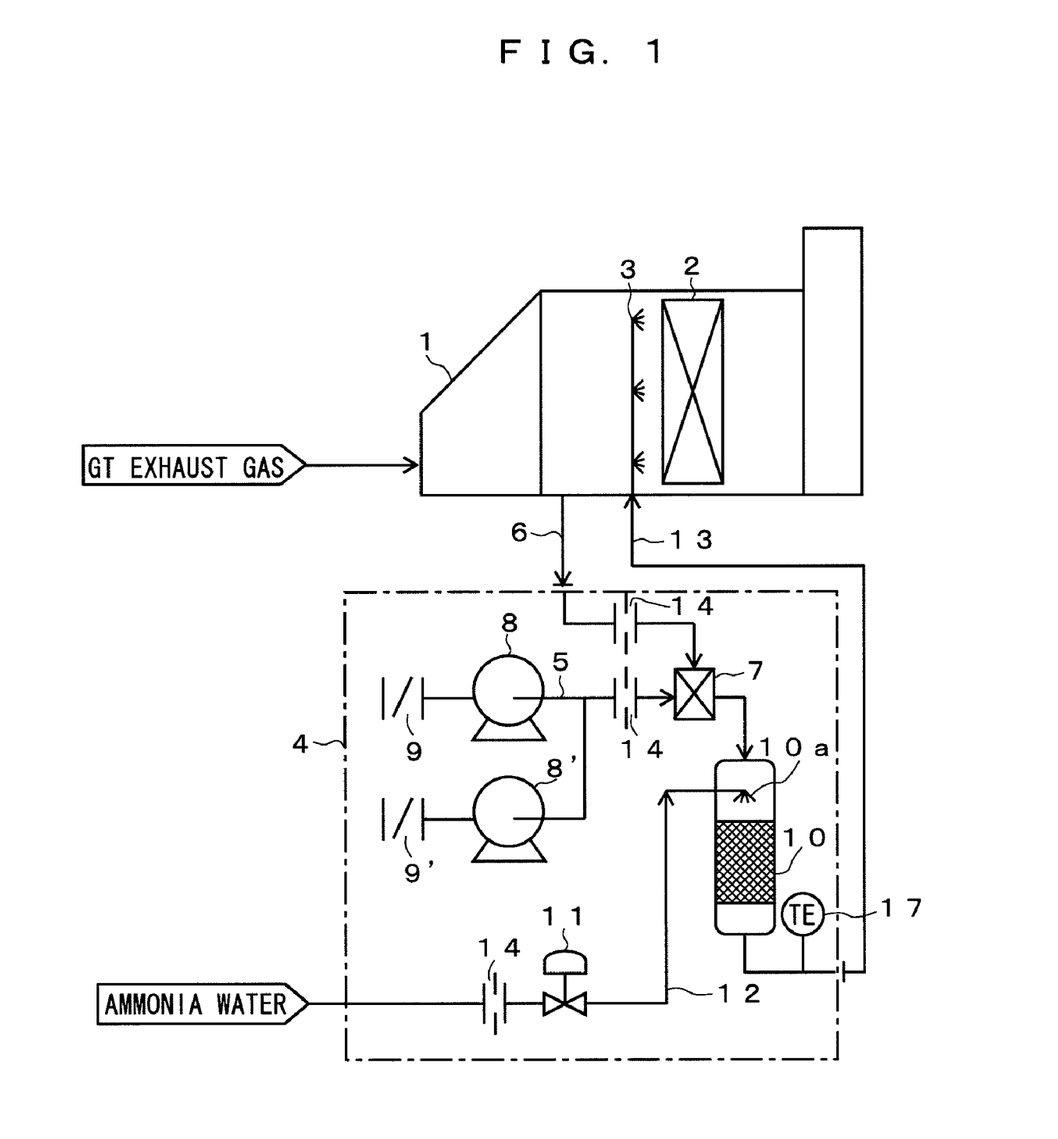
FIG. 1 is a flow diagram of an exhaust smoke denitrating apparatus of Embodiment 1 of the present invention.

FIG. 1 shows an exhaust heat recovery boiler (HRSG) 1 for which a heat conduction pipe (not shown) is disposed in a high-temperature exhaust gas passage of a gas turbine so as to generate vapor, a denitration catalyst layer 2 disposed inside thereof, a nozzle 3 that injects an ammonia-containing gas onto the denitration catalyst layer 2, and an ammonia injection unit 4 for producing the ammonia-containing gas.

In the ammonia injection unit 4, provided are an ejector 7 that extracts an exhaust gas from the exhaust heat recovery boiler 1 via an exhaust gas supply pipe 6, a compressed air blower 8 that supplies compressed air to the ejector 7, a reserve compressed air blower 8', an ammonia water evaporator 10, a supply pipe 12 with a flow regulation valve 11 that supplies ammonia water to the ammonia water evaporator 10, and a supply pipe 13 that supplies an ammonia-containing gas obtained by the ammonia water evaporator 10 to the ammonia injection nozzle 3 of the exhaust heat recovery boiler 1.

Here, the compressed air blowers 8 and 8' are supplied with a fixed volume of air by way of compressed air volume regulation valves 9 and 9', respectively. In addition, an orifice 14 that monitors the compressed air volume is mounted in an air pipe 5 between the compressed air blowers 8 and 8' and the ejector 7, and when the air volume is small, operation of the compressed air blower 8 is switched to the compressed air blower 8' as a reserve unit. In addition, the exhaust gas supply pipe 6 and the ammonia water supply pipe 12 are also provided with orifices 14.

Figure 5:
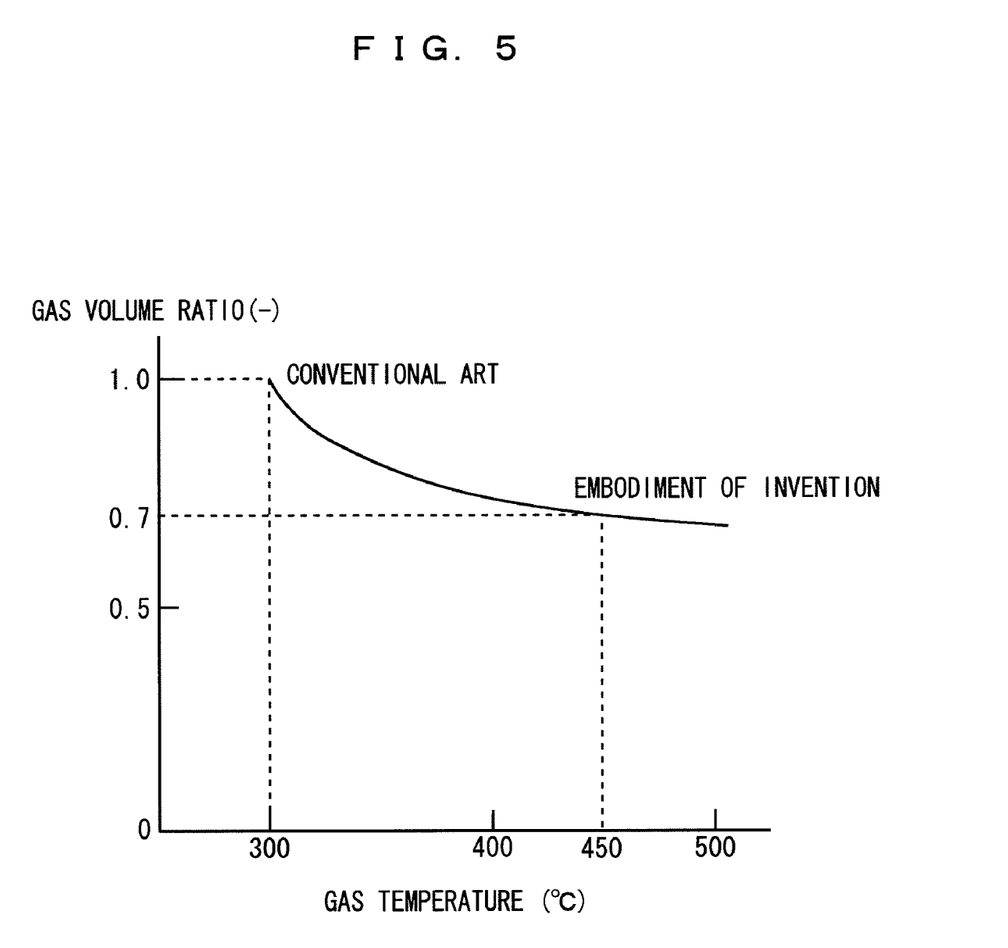
FIG. 5 is a chart showing a relationship between required extracted exhaust gas volume and gas temperature.

The exhaust gas from the exhaust heat recovery boiler 1 is sucked by the ejector 7, is mixed, in the ejector 7, with the compressed air supplied from the compressed air blower 8, and is then delivered to the ammonia water evaporator 10. It is preferable that the exhaust gas from the exhaust heat recovery boiler 1 is a high temperature within a range permitted by the pipe material, and as shown in FIG. 5, with a 450° C. exhaust gas, the required extracted exhaust gas volume can be reduced to approximately 70 percent in comparison with a 300° C. exhaust gas.

In a high-temperature exhaust gas over 450° C., there is a danger of oxidization of an ammonia gas may possibly be oxidized to nitrogen oxides, however, in the present embodiment, the air and exhaust gas supplied from the compressed air blower 8 are mixed in the ejector 7, and the gas temperature is lowered to 300° C. at an inlet of the ammonia water evaporator 10, so that there is no possibility of ammonia oxidization at the time of ammonia water evaporation even when a high-temperature exhaust gas is used.

Moreover, since the abovementioned configuration makes it possible to extract the high-temperature exhaust gas from the exhaust heat recovery boiler 1, air warming within the ammonia injection unit 4 including the ammonia water evaporator 10 can be effectively carried out at an early stage, which greatly contributes to a reduction in the air-warming time at start-up of the ammonia injection unit 4, and disposition restrictions on the high-pressure exhaust gas extracting position in piping of the HRSG 1 are eliminated.

The exhaust gas that has exited an outlet of the ejector 7 enters the ammonia water evaporator 10, is mixed with a predetermined amount of ammonia water injected in the ammonia water evaporator 10, and is used for evaporation of the ammonia water.

Similar to the conventional art, the temperature of an outlet gas of the ammonia water evaporator 10 becomes approximately 100 to 150° C., and the outlet gas is injected into the exhaust gas in the HRSG 1 through the ammonia injection nozzle 3 installed on an upstream side of the denitration catalyst layer 2 within the exhaust heat recovery boiler 1.

In the present embodiment, since the concentration of sulfur trioxide ($SO_3$) in the exhaust gas is diluted in the ammonia water evaporator 10 by the air supplied from the compressed air blower 8, it becomes possible to hold down the precipitation temperature of acidic ammonium sulfate produced when the sulfur trioxide is reacted to the ammonia water, so that ammonium sulfate no longer precipitates in the ammonia water injection nozzle 10a even when sulfur dioxide ($SO_2$) is contained in the exhaust gas.

Moreover, in the ammonia injection unit 4 of the present invention, the moisture level of the exhaust gas is lowered by a mixture with dilution air, thereby enabling inhibition of any drain generation in the piping, and thus air warming within the system including the ammonia water evaporator 10 can be carried out from a low-temperature range (50 to 60° C.).

Furthermore, in the ammonia injection unit 4 of the present invention, the compressed air blower 8 is not directly exposed to a high-temperature exhaust gas, so that no cooler for the compressed air blower 8 is necessary, or no protector for preventing the compressed air blower 8 from a bearing burn-out and the like as described in the section of Disclosure of the Invention is required.

Conventionally, as the rotating equipment such as compressed air blower 25 and 25', two units have been required for an operation and a reserve, and in order to smoothly carry out switching to the reserve blower 25' during operation of the operating compressed air blower 25, an air-warming system (bypass lines 27 and 27' etc.) for the reserve blower 25' has been necessary in the conventional art.

However, in the present embodiment, it is unnecessary to install such an air-warming system for the reserve blower 25', so that the system can be simplified and improved in reliability.

Embodiment 2

Embodiment 2 shall now be described to which the present invention is applied by use of FIG. 2.

Figure 2:
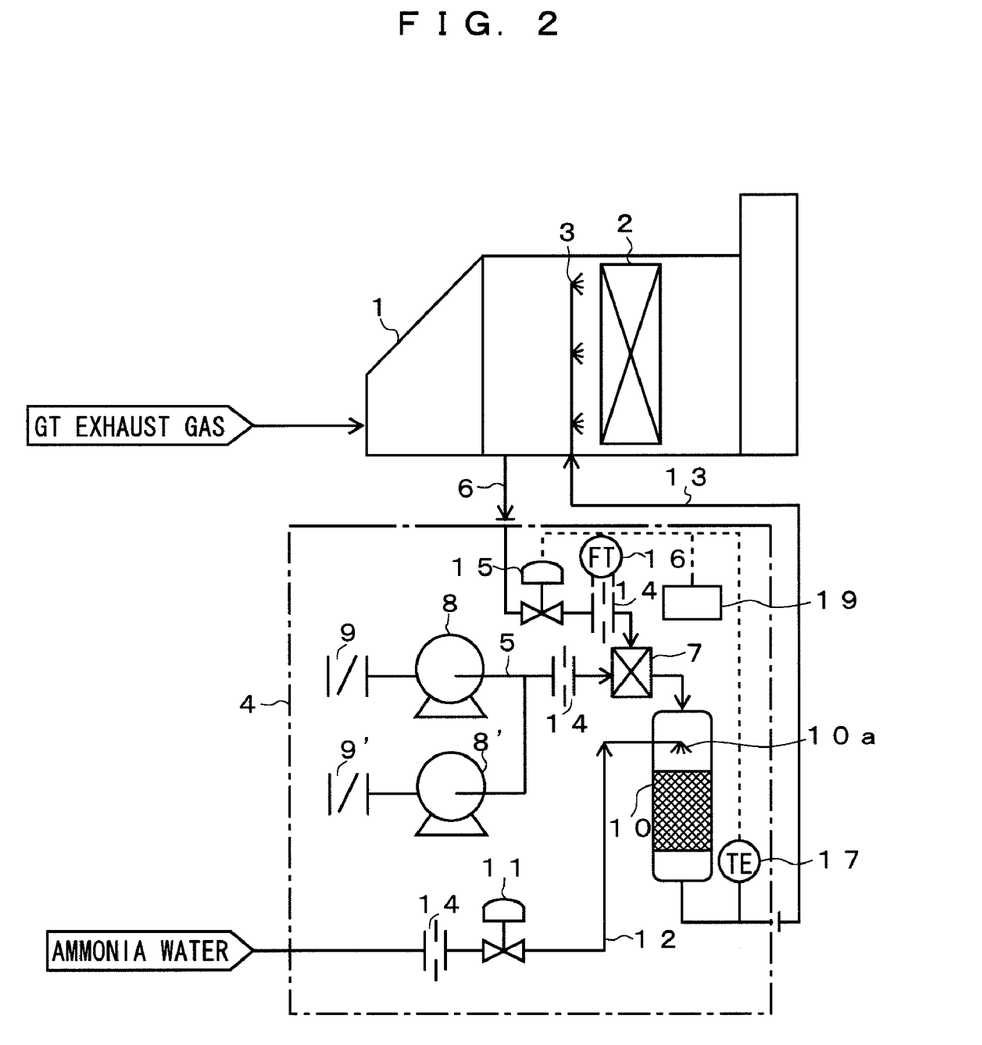
FIG. 2 is a flow diagram of an exhaust smoke denitrating apparatus of Embodiment 2 of the present invention.

The apparatus shown in FIG. 2 has a configuration where an exhaust gas flow regulation damper 15, an exhaust gas flowmeter 16, an outlet thermometer 17 of the ammonia water evaporator 10, and a controller 19 that regulates the degree of opening and closing of the exhaust gas flow regulation damper 15 based on measured values of these measuring devices are provided on the exhaust gas supply pipe 6 on the upstream side of the ejector 7 of the apparatus shown in FIG. 1.

According to the present embodiment, when a further reduction in the exhaust gas usage is required for an improvement in plant utility, it is possible to regulate the exhaust gas volume if necessary by controlling the exhaust gas flow regulation damper 15 provided on the upstream of the ejector 7.

That is, in a condition where the ammonia water has not been injected into the ammonia water evaporator 10, by controlling the exhaust gas flow by the exhaust gas flow regulation damper 15 so as to keep the temperature of an outlet gas of the evaporator at 100 to 150° C. by a signal of the outlet gas thermometer 17 of the ammonia water evaporator 10, air warming and a drain prevention within the system of the ammonia injection unit 4 can be carried out, and it is possible to similarly keep the temperature of the outlet gas of the evaporator 10 fixed at 100 to 150° C. by a signal from the outlet gas thermometer 17 of the ammonia water evaporator 10 from the start of an ammonia injection.

In addition, since the compressed air blower 8 is operated so as to attain a constant-speed rotation and a fixed air flow, the problem of surging produced in a low flow range of the circulating fans 25 and 25' that has been produced in the conventional art does not occur even when the exhaust gas flow is reduced.

Embodiment 3

Figure 3:
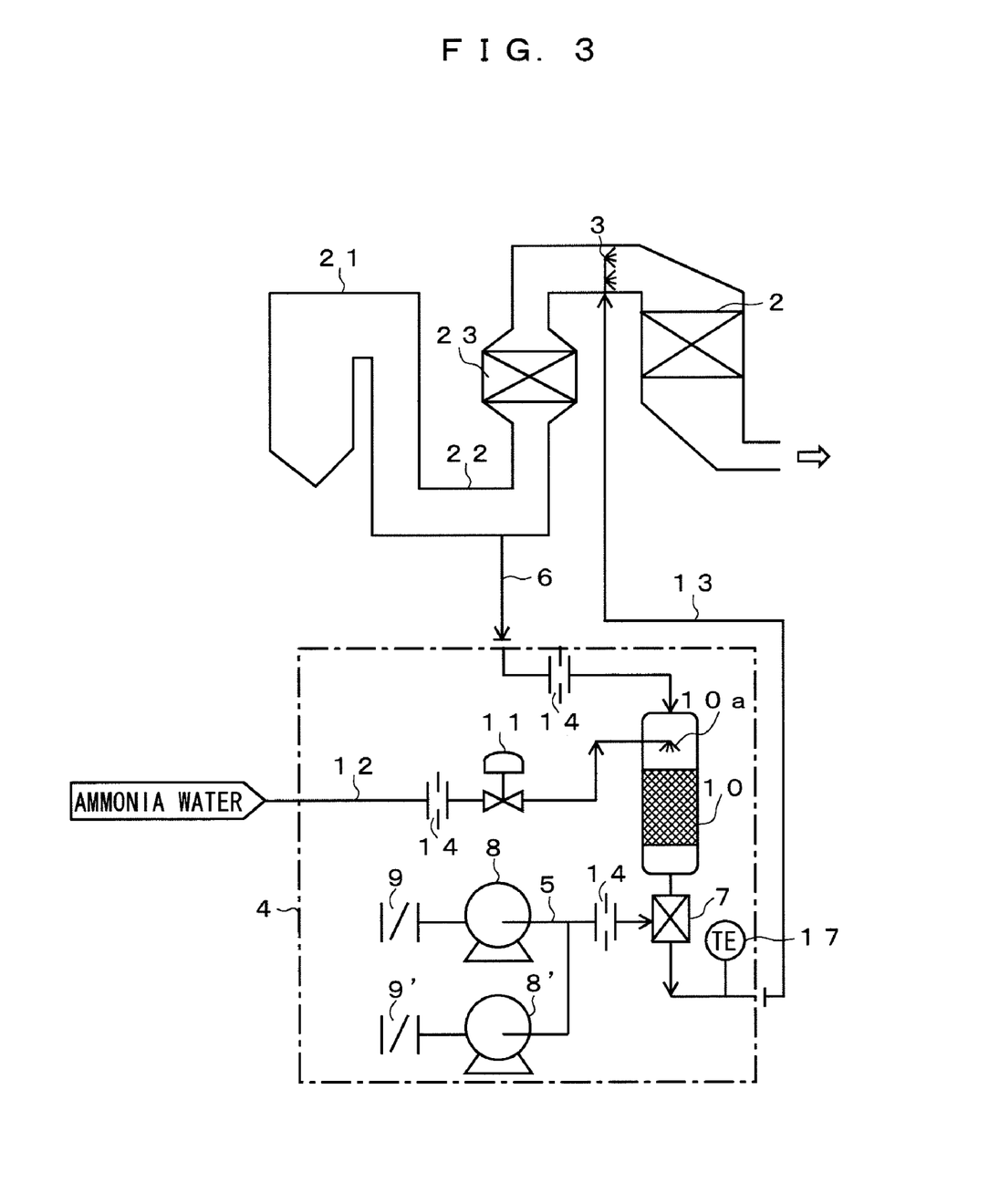
FIG. 3 is a flow diagram of an exhaust smoke denitrating apparatus of Embodiment 3 of the present invention.
Figure 4:
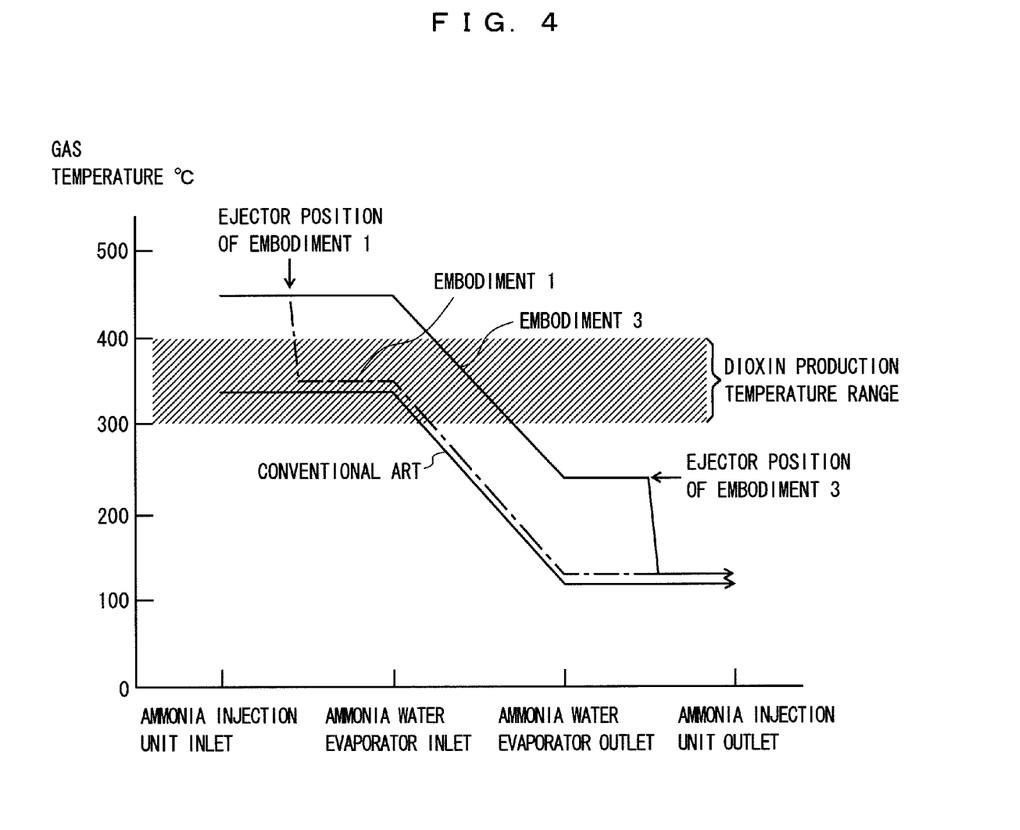
FIG. 4 is a chart showing changes in temperature of the systems in the present invention (Embodiments 1 and 3) and conventional art.

Embodiment 3 shall now be described to which the present invention is applied by use of FIG. 3. The present embodiment is used for a denitrating apparatus provided with a denitration catalyst layer 2 installed in a municipal incinerator 21, and is different from Embodiment 1 in the point that the ammonia water evaporator 10 in the ammonia injection unit 4 is installed at an upper stream side of the ejector 7, and a mixed gas after a predetermined amount of ammonia water is injected and evaporated by the ammonia water evaporator 10 is absorbed by the ejector 7.

The exhaust gas temperature at an outlet of the incinerator 21 is usually around 450° C. to 500° C., and the exhaust gas flows to the denitrating apparatus with the denitration catalyst layer 2 after being lowered in its temperature to 200 to 250° C. by a heat exchanger 23 installed on an exhaust gas passage 22. In addition, at an inlet of the heat exchanger 23, a part of the exhaust gas is sent to the ammonia injection unit 4 through the exhaust gas supply pipe 6.

For the municipal incinerator 21, from the viewpoint of inhibition of dioxin production, it is required in facility design to minimize the exhaust gas retention time in an exhaust gas temperature range of 300 to 400° C., which is a temperature range where dioxin is produced. The present invention is used for a denitrating apparatus installed for the municipal incinerator 21, and can inhibit dioxin production in the ammonia water evaporator 10 by keeping the temperature of an ammonia-containing gas at an outlet of the ammonia water evaporator 10 at 230 to 250° C.

An outlet gas of this ammonia water evaporator 10 is cooled to 100 to 150° C. by being diluted by mixing with air supplied from the compressed air blower 8 by the ejector 7, and is then injected into the exhaust gas through the ammonia injection nozzle 3 installed on the upstream of the denitration catalyst layer 2.

INDUSTRIAL APPLICABILITY

According to the first and fourth aspects of the invention, the following effects are provided.

As a high-temperature exhaust gas extracted from the gas turbine is cooled and diluted by compressed air, there is no possibility of oxidization of ammonia during the stage of evaporation of ammonia water, the moisture level of the exhaust gas can be lowered, thereby enabling inhibition of any drain generation in exhaust gas extraction piping, and thus air warming within the ammonia water evaporation system can be carried out at an early stage, the temperature of an ammonia-containing gas obtained by evaporation of the ammonia water can be lowered, and a reduction in thermal stress within ammonia-containing gas supply system can be easily accomplished, so that denitration of the exhaust gas can be easily accomplished.

According to the second and fifth aspects of the invention, the following effects are provided.

Since the exhaust gas flow to the compressed air supply system can be regulated based on the temperature of the ammonia-containing gas at an outlet of the ammonia water evaporation system and the exhaust gas flow led to the ammonia water evaporation system, air warming and a drain prevention within the ammonia water evaporation system can be carried out, and even when a supply of the ammonia-containing gas to the exhaust gas passage of the gas turbine is started, by regulating the exhaust gas flow led to the ammonia water evaporation system, the ammonia-containing gas temperature can be lowered, and a reduction in thermal stress within ammonia-containing gas supply system can be accomplished, so that denitration of the exhaust gas can be easily accomplished.

According to the third and sixth aspects of the invention, the following effects are provided.

Dioxin production within the ammonia water evaporation system can be inhibited, and moreover, by mixing the ammonia-containing gas with compressed air, a low-temperature mixed gas can be injected into the exhaust-gas passage, which can reduce thermal stress within the ammonia-containing gas supply piping and the like.

Moreover, in common with the first to sixth aspects of the invention, since an exhaust gas extracted from the exhaust gas passage and the like is absorbed by compressed air obtained by use of a blower or the like, the blower for a compressed air supply is not directly exposed to a high-temperature exhaust gas, so that the blower for a compressed air supply can be prevented from burnout, and moreover, since the concentration of sulfur trioxide in the high-temperature exhaust gas is diluted by the air from the blower for a compressed air supply, it becomes possible to hold down the precipitation temperature of acidic ammonium sulfate produced when the sulfur trioxide is reacted to the ammonia water, so that there is no possibility of precipitation ammonium sulfate in the ammonia water injection nozzle of the ammonia water evaporator.

What is claimed is:

1. An exhaust smoke denitrating apparatus which eliminates nitrogen oxides in an exhaust gas, for which an ammonia injection unit and a denitration catalyst layer are disposed on a passage of an exhaust gas discharged from a gas turbine and, wherein
the ammonia injection unit comprises:
an exhaust gas supply passage that makes a part of the exhaust gas from the gas turbine exhaust gas passage flow;
an ejector that extracts the exhaust gas, provided at a front end of the exhaust gas supply passage;
a compressed air blower that supplies compressed air to the ejector;
a mixed gas supply passage that supplies a mixed gas of an exhaust gas and air obtained by the ejector;
an ammonia water supply passage that supplies ammonia water;
an ammonia water evaporator that mixes the mixed gas of an exhaust gas and air from the mixed gas supply passage and the ammonia water from the ammonia water supply passage and evaporates the ammonia water;
an ammonia-containing gas supply passage that supplies an ammonia-containing gas obtained by the ammonia water evaporator to the gas turbine exhaust gas passage on a front stream side of the denitration catalyst layer; and
an ammonia-containing gas injection nozzle provided at a front end of the ammonia-containing gas supply passage.

2. An exhaust smoke denitrating apparatus which eliminates nitrogen oxides in an exhaust gas, for which an ammonia injection unit and a denitration catalyst layer are disposed on a passage of an exhaust gas discharged from a gas turbine and, wherein
the ammonia injection unit comprises:
an exhaust gas supply passage that makes a part of the exhaust gas from the gas turbine exhaust gas passage flow;
an ejector that extracts the exhaust gas, provided at a front end of the exhaust gas supply passage;
a compressed air blower that supplies compressed air to the ejector;
a mixed gas supply passage that supplies a mixed gas of an exhaust gas and air obtained by the ejector;
an ammonia water supply passage that supplies ammonia water;
an ammonia water evaporator that mixes the mixed gas of an exhaust gas and air from the mixed gas supply passage and the ammonia water from the ammonia water supply passage and evaporates the ammonia water;
an ammonia-containing gas supply passage that supplies an ammonia-containing gas obtained by the ammonia water evaporator to the gas turbine exhaust gas passage on a front stream side of the denitration catalyst layer;
an ammonia-containing gas injection nozzle provided at a front end of the ammonia-containing gas supply passage;
an exhaust gas flow regulation valve and an exhaust gas flowmeter provided on the exhaust gas supply passage;
an ammonia-containing gas thermometer provided on the ammonia-containing gas supply passage; and
a controller that regulates the exhaust gas flow regulation valve based on a measured temperature of the ammonia-containing gas of the ammonia-containing gas thermometer and a measured value of an exhaust gas flow of the exhaust gas flowmeter and controls a temperature of the ammonia-containing gas in the ammonia-containing gas supply passage to 100 to 150° C.

3. An exhaust smoke denitrating apparatus which eliminates nitrogen oxides in an exhaust gas, for which an ammonia injection unit and a denitration catalyst layer are disposed on a passage of an exhaust gas discharged from a municipal incinerator and, wherein
the ammonia injection unit comprises:
an exhaust gas supply passage that makes a part of the exhaust gas from the exhaust gas passage of the municipal incinerator flow;
an ammonia water supply passage that supplies ammonia water;
an ammonia water evaporator that mixes the exhaust gas from the exhaust gas supply passage and the ammonia water from the ammonia water supply passage and evaporates the ammonia water;
an ammonia-containing gas supply passage that supplies an ammonia-containing gas obtained by the ammonia water evaporator to the municipal incinerator discharged exhaust gas passage on a front stream side of the denitration catalyst layer;
an ejector provided on the ammonia-containing gas supply passage;
a compressed air blower that supplies compressed air to the ejector; and
an ammonia-containing gas injection nozzle provided at a front end of the ammonia-containing gas supply passage.

* * * * *